3,759,889
ETHYLENE POLYMERIZATION IN THE PRESENCE OF COMPLEX NICKEL CATALYSTS CONTAINING A GLYCOLIC ACID, THIOGLYCOLIC, OR THIOLACTIC ACID LIGAND

Ronald Bauer, Orinda, and Harold Chung and Wilhelm Keim, Berkeley, Calif., and Henry Van Zwet, Amsterdam, Netherlands, assignors to Shell Oil Company, New York, N.Y.
No Drawing. Original application Jan. 15, 1970, Ser. No. 3,199, now Patent No. 3,661,803. Divided and this application Sept. 16, 1971, Ser. No. 181,264
Int. Cl. C08f 1/74, 3/06
U.S. Cl. 260—94.9 C                    12 Claims

ABSTRACT OF THE DISCLOSURE

Ethylene is polymerized in the presence of a catalyst which is the reaction product of a nickel compound with a ligand selected from the group consisting of glycolic acid, thioglycolic acid and thiolactic acid. The nickel compounds comprise olefinically unsaturated compounds of from 2 to 20 carbon atoms. The preferred nickel compound is biscyclooctadiene-1,5-nickel.

---

This is a division, of application Ser. No. 3,199, filed Jan. 15, 1970, now U.S. Pat. 3,661,803.

A variety of polymerization catalyst, both homogenous and heterogeneous, has been utilized to convert ethylene into products of higher molecular weight. One widely used class of catalyst is the so-called "Ziegler type" which is the result of the reaction of a higher valence transition metal compound and a Group I, II or III metal alloy, hydride or organic derivative of the Group I, II or III metal having an organo metallic bond.

The present invention is directed toward the polymerization of ethylene and to novel compositions used as catalysts in these polymerizations. The catalyst composition of this invention is the reaction product of a nickel compound and a ligand selected from the group consisting of glycolic acid, thioglycolic acid and thiolactic acid. The nickel compounds comprise an atom of nickel in complex with an olefinically unsaturated compound of from 2 to 20 carbon atoms. The preferred nickel compound is biscyclooctadiene-1,5-nickel.

U.S. Pat. 3,324,092, Naarmann et al., issued June 6, 1967, is directed to a process for polymerizing olefins in the presence of a chelate of a metal from Group I–B, II–B,, IV–A, V–A, V–B, VI–B, VII–B or VII of the Periodic System and an unsaturated aliphatic cyclic hydrocarbon having 5 to 12 carbon atoms in the ring. Compounds suitable for the formation of the metal chelate compounds are compounds containing two functional groups which can become linked with metal atoms, one group being linked by main valences and the other by coordinate bonds. These suitable compounds are β-diketones, such as acetylacetonate, β-ketocarboxylic esters, such as ethyl- and 3-methylbutene-(1)-ol-(3)-acetoacetate, amine acids having two to six carbon atoms, such as glycine and histidine, hydroxyaldehydes, such as salicyaldehyde, and also o-aminophenol, o-aminobenzoic acid or 4,5-phenanthroline (o-phenanthroline).

The present invention is directed to novel catalyst compositions for the polymerization of ethylene. These compositions have not previously been disclosed in the art. The catalysts of the present invention are the products of the reaction of a nickel-olefin complex with an organic acid ligand as described. It has surprisingly been found that only certain organic acid ligands within this group are suitable for reaction with nickel compounds to produce active ethylene polymerization catalysts. Applicants have found that glycolic acid, thioglycolic acid and thiolactic acid are suitable ligands for producing catalysts of the general description above for polymerizing ethylene to highly linear polymer products. This observation is surprising in view of the fact that applicants have found that compositions from similar ligands, notably acetic acid, $HSCH_2CH_2COOH$, $HSCH_2COOC_2H_5$, 1-thioglycerol, are not suitable catalysts for the polymerization of ethylene.

The catalysts of the present invention are described as the product of the reaction of a nickel compound comprising an atom of nickel in complex with an olefinically unsaturated compound, preferably biscycloactadiene-1,5-nickel (O), with a ligand selected from the group consisting of glycolic acid, thioglycolic acid and thiolactic acid.

The nickel compound employed as a catalyst for the polymerization process may be described as comprising an atom of nickel from a biscyclooctadiene nickel (O) complex or like complex of nickel (O) or nickel (I) further complexed with a ligand selected from the group consisting of glycolic acid, thioglycolic acid and thiolactic acid. This preceding description is suitable but is not preferred for the reasons discussed below.

Although it is not desired to be bound by any particular theory it appears likely that the catalyst molecule undergoes chemical transformations during the course of the polymerization reaction possibly involving coordination and/or bonding of ethylene to the nickel moiety. However, it appears likely that the acid ligand remains complex and/or chemically bonded to the nickel moiety during the course of the reaction and that this complex or nickel and acid ligand is the effective catalytic species of the polymerization process. In any event, the ligand is an essential component of the catalyst and provided the nickel catalyst contains the required acid ligand, the nickel catalyst may be complexed with a variety of additional organic complexing ligands.

The catalysts of the present invention are typically formed in situ in the reaction medium but the present invention encompasses the nickel-acid catalysts as described regardless of what sequence is used for catalyst preparation and polymerization. Whether the catalyst is formed and perhaps even identified prior to its use as a polymerization catalyst or is formed in the reaction medium while the polymerization is proceeding, its exact active form during the polymerization reaction is not precisely ascertainable. For this reason the catalyst is preferably described as the product of the reaction of the nickel compound with the ligand selected from the group consisting of glycolic acid, thioglycolic acid and thiolactic acid as described.

When the catalyst is characterized as the product of the reaction of a nickel compound with the acid ligand wherein the nickel compound is selected from the group consisting of nickel (O) compositions and nickel (I) compositions, the characterization does not encompass nickel which is reducible to a lower positive valence state. In the case of the Ni (I) compositions, the nickel is capable of being reduced to a lower (nonpositive) valence state which is zero (0). The nickel (O) compositions comprise an atom of nickel complexed or chemically bonded to sufficient complexing ligands to satisfy the coordination number of the nickel atom which typically but not invariably is four. However, because of the difficulty in ascribing oxidation states or valences to transition metal-containing catalysts, the catalysts of the present invention are preferably defined in terms of reaction products as above or in terms of an empirical representation as described below rather than in precise bonding or oxidation state terms.

In another manner of describing the catalysts of the present invention, the compositions are represented by the empirical Formula I:

(I)                  $L_nNi(Z)_m$ wherein Z is selected from the group consisting of glycolic acid, thioglycolic acid and thiolactic acid, L is an olefinically unsaturated compound of from 2 to 20 carbon atoms, of up to 4 olefinic linkages, and of up to 3 carbocyclic rings, n and m are selected from numbers of from 1 to 3 and the sum of n and m may be but is not necessarily equal to 4. However, as pointed out above, it is preferred to describe the catalyst as the reaction product of the nickel complex and the acid ligand and it is to be understood that the composition as depicted in Formula I is meant only to represent the empirical composition and that the precise nature of the bonding between the glycolic acid ligand, thioglycolic acid ligand or thiolactic acid ligand and the nickel moiety is not definitely known. However, it is considered likely that the nickel is in a low valence state, e.g. zero-valent or mono-valent nickel, which valence state is dependent on the nature of the chemical bonding between the nickel moiety and the ligand.

The organic complexing ligand L is an olefinically unsaturated compound of from 2 to 20 carbon atoms, of up to 4 olefinic linkages and of up to 3 carbocyclic rings. A particularly preferred class of olefinically unsaturated compounds are olefins of from 2 to 12 carbon atoms, represented by the Formula II:

(II)                  

wherein R' and R" independently are hydrogen, alkyl, cycloalkyl, alkenyl, cycloalkenyl, aralkyl, aryl or alkaryl of up to 8 carbon atoms, with the proviso that the R' and R" groups may together form a divalent aliphatic moiety of from 2 to 10 carbon atoms of up to three additional olefinic double bonds as the sole carbon-carbon unsaturation.

Illustrative olefins of Formula II therefore include ethylene, propylene, 2-butene, 1-pentene, 1-hexene, 1-octene, 1-decene, butadiene, isoprene, 1,3,5-octatriene, 1,3,7-octatriene, cyclopentene, cycloheptene, cyclopentadiene, cyclohexa - 1,3 - diene, cycloocta - 1,5 - diene, cyclooctatriene, cyclooctatetraene and cyclododecatriene.

The particularly preferred organic complexing ligand L for this invention is cyclooctadiene. This moiety is unique and gives particularly good results in the polymerization of ethylene as will be shown later. The cyclooctadiene, in bonding terms, is π-bonded to the nickel as opposed to the sigma bonding between nickel and for instance cyclopentadienyl chelates or at least is bonded to the nickel in a manner different than the chelate bonding between cyclopentadiene and nickel.

The nickel composition employed in the polymerization process is prepared by a variety of methods. In a preferred method, the catalyst composition is prepared by contacting an olefinic-nickel compound and the acid ligand. The preferred class of olefinic-nickel compounds useful as catalyst precursors are zero-valent nickel compounds represented by the Formula III:

(III)           

wherein R'CH=CHR" has the significance as defined in Formula II. Illustrative nickel compounds of Formula III are therefore biscyclooctadiene nickel (O), biscyclooctatetraene nickel (O), and bis(1,3,7 - octatriene) nickel (O).

Another class of olefinic-nickel compounds useful as catalyst precursors is π-allyl nickel compounds wherein the nickel moiety is bonded to an π-allylic moiety characterized by delocalization of the electronic contribution of the π-allyl moiety among three contiguous carbon atoms. One suitable type of π-allyl nickel compounds is represented by the Formula IV:

(IV)               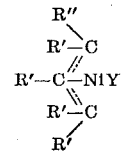

wherein R' and R" independently are hydrogen, alkyl, cycloalkyl, alkenyl, cycloalkenyl, aralkyl, aryl or alkaryl of up to 8 carbon atoms, Y is halogen, preferably halogen of atomic number from 17 to 35 inclusive, i.e. chlorine or bromine, alkoxy or alkanoyloxy of up to 10 carbon atoms, and the dotted line designation represents the electronic delocalization among the three illustrated contiguous carbon atoms, with the proviso that R" together with one R' may form a divalent alkylene moiety of 2 to 10 carbon atoms, preferably 2 to 5 and of up 3 additional olefinic double bonds. When considered as a whole, preferred π-allyl moieties have from 3 to 12 carbon atoms and are otherwise free from aliphatic unsaturation unless the π-allyl moiety is part of a closed ring system.

Illustrative of suitable π-allyl nickel halides of the above Formua IV are π-allylnickel chloride, π-allylnickel bromide, π - crotylnickel chloride, π - methylallylnickel chloride πethylallylnickel chloride, π-cycopentenylnickel bromide, π-cyclooctenylnickel chloride, π-cyclooctadienylnickel chloride, π - cinnamylnickel bromide, π - phenylallylnickel chloride, π - cyclohexenylnickel bromide, π-cycloododecenylnickel chloride and π-cyclododecatrienylnickel chloride. Although the complex of the above Formula IV and other π-allyl nickel halides probably exist independently in the form of a dimer, for convenience and simplicity the π-allyl nickel halides are herein depicted and named as monomeric species.

Other suitable π-allyl nickel compounds of Formula IV are π-allylnickel acetate, π-methylallylnickelpropionate, π - cyclooctanylnickel octoate, π-allylnickel methoxyate and π-allylnickel ethoxyate.

Another suitable type of π-allyl nickel compounds useful as catalyst precursors is bis-π-allyl nickel compounds represented by the Formula V:

(V)           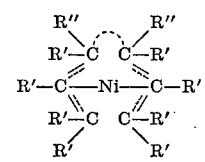

wherein R", R' and the dotted line designation have the same significance as defined in Formula IV with the proviso that R" together with one R' of the same π-allylic moiety may form a divalent alkylene moiety of 2 to 10 carbon atoms, preferably of 2 to 5. When considered as a whole, preferred π-allyl moieties have from 3 to 12 carbon atoms and are otherwise free from aliphatic unsaturation unless the allyl moiety is part of a closed ring system. Illustrative of suitable bis - π - allyl nickel compounds of the above Formua V are bis - π - allyl nickel, bis - π - methallyl nickel, bis - π - cinnamyl nickel bis - π - octadienylnickel, bis - π - cyclohexenylnickel, π - allyl - π - methallylnickel, and bis - π - cyclooctatrienylnickel.

The catalyst composition is suitably preformed by contacting the catalyst precursors in an inert diluent, e.g. diluents employed for the polymerization process. In another modification, however, the catalyst precursor components are contacted in the presence of the ethylene reactant during the initiation of the polymerization process. By any modification, the catalyst precursor components are contacted at temperatures from about 25° C. to 100° C. In the reaction, the ratio of nickel component to acid ligand can be between 0.5:1 to 1:12 with a preferred range of 1:1 to 1:4.

The nickel catalyst is suitably employed as an unsupported material. In certain modifications, the nickel catalyst can be supported on an inorganic, solid catalyst carrier which is normally solid under reaction conditions and is heterogeneous, i.e. is substantially insoluble in the reaction medium. Illustrative of suitable inorganic, solid catalyst carriers are inorganic acidic oxides such as alumina and inorganic materials known as refractory oxides. Suitable refractory oxides include synthetic components as well as acid treated clays and similar material such as kieselguhr or crystalline macroreticular aluminosilicates known in the art as molecular sieves. In general, synthetic catalyst carriers are preferred over natural occurring materials or molecular sieves. Exemplary synthetic refractory catalyst carriers include alumina, silica-alumina, silica-magnesia, silica-alumina-titania, silica-alumina-zirconia, silica-titania-zirconia, silica - magnesia - alumina and the like. Particularly preferred catalyst carriers are siliceous refractory oxides containing up to 90% by weight of alumina, especially silica and silica-alumina.

When the catalyst composition is supported, the proportion of catalyst composition to carrier is not critical. In general, proportions of catalyst composition from about 0.01% to about 70% by weight, based on the catalyst carrier are satisfactory, with amounts of from about 0.1% to about 20% by weight, calculated on the same basis, being preferred. The catalyst composition is introduced onto the carrier in any suitable manner. In one modification, the supported catalyst composition is prepared by intimately contacting the preformed catalyst composition and the carrier in an inert diluent, preferably the same inert diluent employed for preparing the catalyst composition. In another modification, the catalyst compositions can be prepared directly on the catalyst carrier support surface by contacting the catalyst composition precursors in the presence of the catalyst carrier in a suitable inert diluent.

The amount of catalyst composition employed in the polymerization process is not critical. In general, amounts of catalyst composition from about 0.001% by weight to about 100% by weight based on ethylene are satisfactory with amounts from about 0.01% by weight to about 25% by weight on the same basis being preferred. The ethylene is contacted with the catalyst composition or the catalyst precursor components in the liquid phase in the absence or presence of reaction solvent or diluent which is liquid at reaction temperature and pressure. Illustrative of suitable diluents and solvents are aromatic compounds such as benzene, toluene, chlorobenzene and oxygenated hydrocarbons such as dialkyl ketones, e.g. acetone, methyl ethyl ketone and ethyl butyl ketone; cycloalkyl ethers, e.g. dioxane, tetrahydrofuran and tetrahydropyran; and acyclic alkyl ethers, e.g. dimethoxyethane, diethylene glycol, dimethyl ether and dibutyl ether. Other suitable solvents or diluents include nitriles such as acetonitrile and propionitrile, dialkylamides such as dimethylformamide; and dialkylsulfoxides such as dimethylsulfoxide. Still other suitable solvents or diluents comprise water or water containing a portion of a polar organic co-solvent. Alkanes and alkenes, including cycloalkanes and cycloalkenes, of from 5 to 20 carbon atoms such as butene-1, isopentane, pentene, cyclopentane, cyclohexane, isohexane, heptane, isooctane, decane, decene-1, dodecane, hexadecene and eicosane are also suitable reaction solvents. In some modifications of the polymerization process, a portion of the product suitably serves as reaction diluent and no added diluent is employed. When diluent is utilized, however, amounts up to about 30 moles of diluent per mole of ethylene are satisfactory. Preferred reaction diluents and solvents are aromatic hydrocarbons, lower dialkylsulfoxides, lower alkyl nitriles, alkanes, or mixtures thereof.

A particularly surprising aspect of the present invention is that the polymerization reaction can be suitably carried out in water. Thus water is a most preferred reaction medium for this invention. The water may, but does not necessarily contain a polar organic solvent. Suitable mixtures of water and polar organic solvent vary by volume from about 20% to 80% organic solvent and from about 80% water to 20%.

The process is suitably conducted in an inert reaction environment so that the presence of reactive materials such as oxygen is desirably avoided. Reaction conditions are therefore substantially oxygen-free.

The precise method of establishing ethylene/catalyst contact is not critical. In one modification, the catalyst composition and the diluent are charged to an autoclave or similar pressure reactor, the ethylene feed is introduced, and the reaction mixture is maintained with agitation at reaction temperature and pressure for the desired reaction period. Another modification comprises passing, in a continuous manner, the ethylene reactant in liquid phase solution in the reaction diluent through a reaction zone in which a supported catalyst composition is maintained. By any modification, the polymerization process is conducted at moderate temperatures and pressures. Suitable reaction temperatures vary from about 25° C. to 250° C., but preferably from 30° C. to 80° C. The reaction is conducted at or above atmospheric pressure. The precise pressure is not critical, so long as the reaction mixture is maintained substantially in a non-gaseous phase. Typical pressure vary from about 10 p.s.i.g. to 5000 p.s.i.g. with the range from about 100 p.s.i.g. to 1000 p.s.i.g. being preferred.

The polymerization products are separated and recovered from the reaction mixture by conventional methods such as fractional distillation, selective extraction, filtration, adsorption and the like. The reaction diluent, catalyst and any unreacted ethylene are recycled for further utilization.

During the polymerization process ethylene is converted to principally high molecular weight, polymer products, i.e. polyethylene The products are characterized by high linearity and crystallinity. Generally, the products are characterized by a high molecular weight, a linearity of less than 1 branch per 1000 monomer units and an inherent viscosity (0.10 g./100 ml. solvent at 135° C.) of between 1 to 10 dl./g. These products are materials of established commercial value. The polyethylenes can be used as wire and cable insulation, or for making containers, pipes, housewares, filaments, films and coatings.

To further illustrate the improved process of the invention and the novel catalyst composition, therefore, the following examples are provided.

EXAMPLE I

A catalyst mixture was prepared by reacting 0.115 g. of thiolactic acid (2-thiopropionic acid) with 0.373 g. of biscyclooctadiene-1,5-nickel (O) dissolved in 10 ml. of toluene. The catalyst was added to 135 ml. of dry toluene in a 300 ml. stainless steel autoclave. The reactor was sealed, purged with argon, and pressured to 2000 p.s.i. The polymerization was carried out with addition of ethylene under a constant pressure of 2000 p.s.i. at ambient temperature. After three hours the reactor was vented and a solid product was collected by filtration. There was obtained 1.3 g. of high density polyethylene having an inherent viscosity of 0.3 dl./g. (0.3 g. polymer/100 ml. Decalin at 135° C.).

EXAMPLE II

A catalyst solution prepared from 0.405 g. biscyclooctadiene-1,5-nickel (O) and 0.112 g. glycolic acid in 20 ml. of dry toluene was charged to an 80 ml. stainless steel autoclave that had been purged with argon. The reactor was initially pressured to 900 p.s.i. with ethylene and heated to 65° C. The ethylene pressure was maintained at 1275 p.s.i. throughout 2½ hours of reaction time. Solid linear polyethylene in amount of 1.55 g. was isolated by filtration and washing with methanol.

EXAMPLE III

A supported catalyst was prepared by admixing 2.0 g. of microspheriodal alumina (calcined at 4000 C. for 4 hours in an atmosphere of nitrogen), 0.275 g. of biscyclooctadiene-1,5-nickel (O), 0.100 g. of thioglycolic acid and 25 ml. of toluene for 15 minutes. The resulting supported catalyst was filtered, washed three times with n-hexane, and dried in vacuo. The dried catalyst and 25 ml. n- hexane were charged into a metal reactor, and ethylene monomer was introduced to an initial pressure of 750 p.s.i. The polymerization reaction was carried out at 60° C. for 2 hours. The polymer formed was precipitated with methanol, filtered and dried in vacuo. The yield was 8.25 g. of linear polyethylene

EXAMPLE IV

A supported catalyst was prepared by admixing 12.0 g. of microspheroidal alumina (calcined at 400° C. for 4 hours in an atmosphere of nitrogen), 1.65 g. of biscyclooctadiene-1,5-nickel (O), 0.452 g. of thioglycolic acid and 40 ml. of toluene. The resulting supported catalyst was then filtered, washed three times with n-hexane and dried in vacuo.

The supported catalyst, 2.0 gm., and 30 ml. of dry n-hexane was charged to an 80 ml. stainless steel autoclave under a nitrogen atmosphere. The reactor was pressured with ethylene to 900–1000 p.s.i. and reacted at 70° C. for 1 hour. After cooling the reactor to room temperature, the unreacted ethylene was vented, and the resulting polymer was isolated by precipitation in methanol. There was obtained 4.9 gm. of linear polyethylene.

EXAMPLE V

A supported catalyst was prepared by admixing 8.0 g. of a cracking catalyst which contained 25% $Al_2O_3/SiO_2$ (calcined at 400° C. for 4 hours in an atmosphere of nitrogen), 1.10 g. of biscyclooctadiene-1,5-nickel (O), 0.368 g. thioglycolic acid and 56 ml. of toluene. The resulting supported catalyst was filtered and washed three times with n-hexane and dried in vacuo.

The supported catalyst, 1.0 gm., and 30 ml. of dry hexane, were charged to a 80 ml. stainless steel autoclave under a nitrogen atmosphere. The reactor was pressured with ethylene to 900–1000 p.s.i. and reacted at 65±4° C. for 1 hour. After cooling the reactor to room temperature the unreacted ethylene was vented and the resulting polymer was isolated by precipitation in methanol. There was obtained 3.9 gm. of linear polyethylene.

EXAMPLE VI

A catalyst was prepared from the reaction of 4.5 gm. of biscyclooctadiene-nickel (O) and 1.66 gm. of thioglycolic acid in 80 ml. dry toluene under an argon atmosphere. The reaction mixture was stirred overnight at ambient temperature with the formation of a black complex. The resulting catalyst was isolated via precipitation with n-hexane, filtered, washed with n-hexane three times and dried under high vacuum at ambient temperature. The catalyst yield was 2.33 gm.

The isolated catalyst, 0.14 gm., and 25 ml. of dry n-hexane was charged into a 60 ml. stainless steel autoclave under a nitrogen atmosphere. The reactor was charged with an initial pressure of 750 p.s.i. ethylene, and the polymerization reaction was carried out at 60° C. for 4 hours. Solid polyethylene in amount of 1.3 gm. was isolated by filtration and washing with methanol.

EXAMPLES VII TO IX

In a manner similar to the procedures of Examples I to VI, each of the combinations of reaction products of nickel compound, acid ligand and support (if any) indicated in the table is used in a polymerization of ethylene to produce polyethylene of characteristics similar to those of the products of Examples I to VI.

TABLE

| | Nickel compound | Acid ligand | Support |
|---|---|---|---|
| VII | Bisacrylonitrile nickel | Thioglycolic acid | Micro-spheroidal alumina. |
| VIII | Bis-π-allyl nickel | do | Do. |
| IX | Bis-π-methallyl nickel | Thiolactic acid | 25% $Al_2O_3/SiO_2$ cracking catalyst. |

What is claimed is:

1. A process of polymerizing ethylene by contact in an inert liquid diluent and in an inert reaction environment in the substantial absence of oxygen, at a temperature of about 25° C. to 250° C., in the presence of a catalytic amount in the range from 0.001 to 100% by weight, based on ethylene, of a catalyst which is the product of the reaction of one mole of a nickel compound comprising an atom of nickel in complex with an olefinically unsaturated compound, with from 2 to 12 moles of a ligand selected from the group consisting of glycolic acid, thioglycolic acid and thiolactic acid.

2. The process of claim 1 wherein said catalyst is represented by the formula:

$$L_nNi(Z)_m$$

wherein Ni has a valence of 0 or 1; Z is selected from the group consisting of glycolic acid, thioglycolic acid and thiolactic acid; L is an olefinically unsaturated compound of from 2 to 20 carbon atoms, of up to 4 olefinic linkages, and of up to 3 carbocyclic rings; and $n$ and $m$ are selected from numbers of from 1 to 3.

3. The process of claim 1 wherein said nickel compound is represented by a formula selected from the group consisting of:

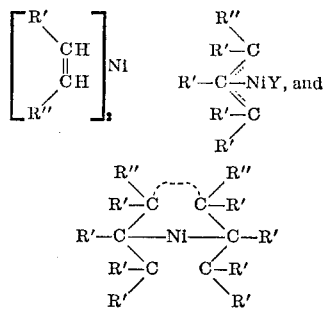

wherein R″ and R′ independently are hydrogen, alkyl, cycloalkyl, alkenyl, cycloalkenyl, aralkyl, aryl or alkaryl of up to 8 carbon atoms and Y is halogen of atomic number 17 to 53 inclusive, alkoxy or alkanoyloxy of up to 10 carbon atoms with the provisio that R″ together with one R′ may form a divalent alkylene moiety of 2 to 10 carbon atoms and of up to three additional olefinic double bonds.

4. The process of claim 1 in which said nickel compound is reacted with said acid ligand in a molar ratio of nickel compound to ligand of from about 1:1 to 1:4.

5. The process of claim 1 in which said nickel compound is reacted with said acid ligand at a temperature of from about 25° C. to 100° C.

6. The process of claim 1 in which said catalyst is supported on an inorganic, solid carrier.

7. The process of claim 6 in which said carrier is selected from the group consisting of inorganic acidic oxides and siliceous refractory oxides.

8. The process of claim 1 in which said catalyst is employed in an amount from about 0.01% by weight to about 25% by weight based on the ethylene.

9. The process of claim 1 in which said polymerization process is carried out at a temperature of about 30° C. to 80° C. and at a pressure from about 10 p.s.i.g. to 5000 p.s.i.g.

10. The process of claim 9 wherein said polymerization process is carried out at a pressure from about 100 p.s.i.g. to 1000 p.s.i.g.

11. The process of claim 1 wherein said nickel compound is biscyclooctadiene-1,5-nickel (O).

12. The process of claim 1 wherein said polymerization is conducted in water.

References Cited

UNITED STATES PATENTS

| | | | |
|---|---|---|---|
| 3,497,488 | 2/1970 | Dawans et al. | 260—94.9 B |
| 3,644,563 | 2/1972 | Bauer et al. | 260—94.9 B |
| 3,644,564 | 2/1972 | Zwet et al. | 260—94.9 B |
| 3,637,636 | 1/1972 | Bauer et al. | 260—94.9 B |

OTHER REFERENCES

Kirk-Othmer, Encyclopedia of Chemical Technology, 2nd Ed., vol. 1, pp. 234–235.

JOSEPH L. SHOFER, Primary Examiner

E. J. SMITH, Assistant Examiner

U.S. Cl. X.R.

260—94.9 B, 94.9 DA